May 5, 1942. C. W. HIGGS Re. 22,088
CLUTCH
Original Filed May 28, 1937 3 Sheets-Sheet 1
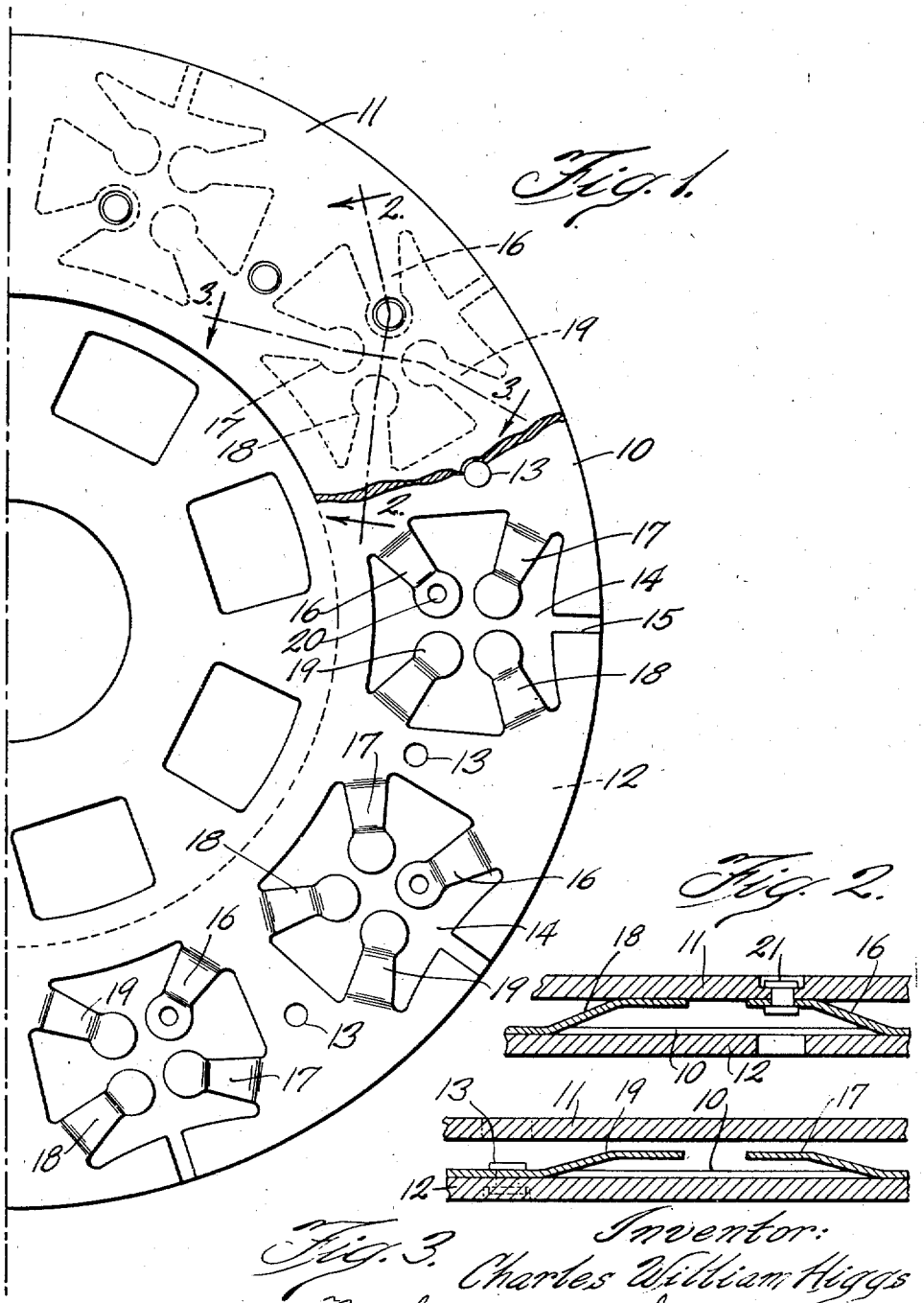
Inventor:
Charles William Higgs
By Edward C. Gritzbaugh
Atty.

May 5, 1942. C. W. HIGGS Re. 22,088

CLUTCH

Original Filed May 28, 1937 3 Sheets-Sheet 2

Inventor:
Charles William Higgs
By Edward C. Fritzhaugh Atty.

May 5, 1942. C. W. HIGGS Re. 22,088
CLUTCH
Original Filed May 28, 1937 3 Sheets-Sheet 3
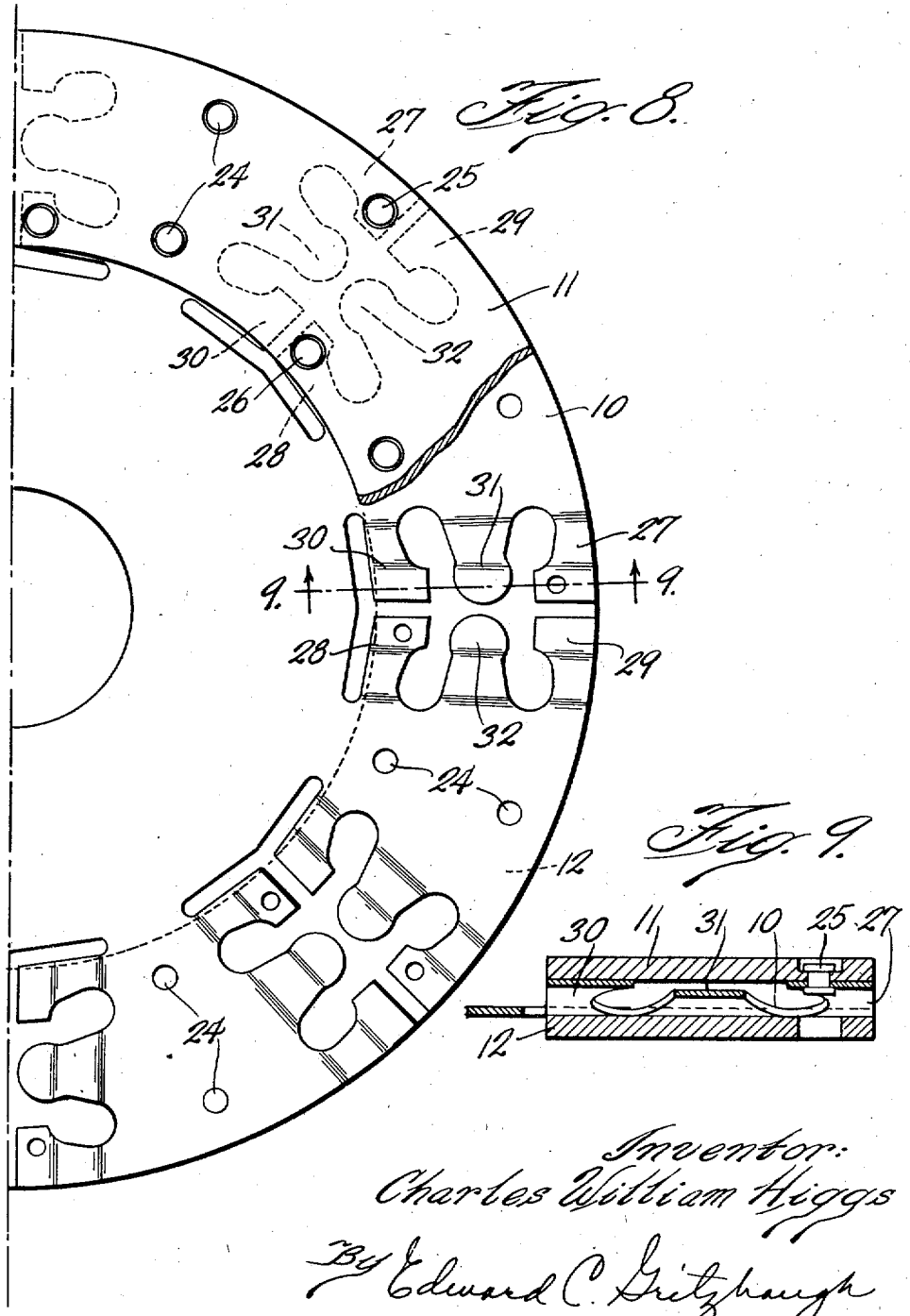
Inventor:
Charles William Higgs
By Edward C. Gritzbaugh
Atty.

Reissued May 5, 1942

Re. 22,088

UNITED STATES PATENT OFFICE 22,088

CLUTCH

Charles William Higgs, London, England, assignor to Borg-Warner Corporation, Chicago, Ill., a corporation of Illinois Original No. 2,194,793, dated March 26, 1940, Serial No. 145,249, May 28, 1937. Application for reissue April 23, 1941, Serial No. 389,896. In Great Britain August 1, 1936

18 Claims. (Cl. 192—107)

This invention relates to clutches of the general type in which a circular plate has its peripheral portion provided on one or each side with a friction facing carried in a resilient manner, so that as the clutch is engaged the resilient mounting of the facing or facings enables the load to be taken up gradually.

It is the primary object of the present invention to provide an improved construction of clutch plate in which the mounting of the facings is adapted to provide two or more resilient steps which have to be overcome before the plate becomes fully compressed.

According to one feature of the invention a clutch plate is provided comprising a disc carrying a facing on each side, at least one of said facings being resiliently mounted upon tongues, and being arranged so that after a predetermined amount of compression the number of tongues coacting with said facing is increased, the invention being characterized by the fact that said facing is mounted so that it at all times, both before and during compression, tends to remain parallel with the general plane of the disc.

The invention thus provides a clutch plate comprising a disc carrying a facing at each side, at least one of said facings being resiliently mounted upon one set of tongues, and being arranged so that after a predetermined amount of compression it coacts with another set of tongues to produce two stages of compression, one or each of the facings being mounted so that it is at all times held in a plane lying substantially parallel with the plane of the disc.

As a further feature the invention provides a clutch plate comprising a disc carrying a facing on each side, at least one of said facings being resiliently mounted upon the disc by means of a plurality of sets of laterally deflected tongues which cause the resilient pressure exerted by the facing during engagement to increase in stages, wherein said facing at all times tends to remain parallel with the plane of the disc and to exert a uniform resilient pressure over its whole area, for which purpose the tongues comprising each set are substantially equal in shape and size, and the points at which the tongues are secured to, or coact with the facing are all displaced the same distance from the plane of the disc. Preferably, the points of coengagement between the tongues and the corresponding facing are uniformly distributed between the inner and outer margins of the facing.

Another form of plate according to the invention comprises a disc carrying a facing on each side and formed at intervals around its circumference with cutaway parts which are shaped so as to provide in each case a straight radial gap extending inwardly to the full extent of the cut away portion, said gap being circumferentially branched to form a plurality of pairs of tongues which are bent laterally and coact with at least one of the facings, said tongues being bent out of the plane of the disc so that they form a plurality of series which come into operation successively during the engagement of the clutch, and those of said tongues comprising each individual series being of substantially equal size and shape whereby the facing at all times tends to assume a position lying truly parallel with the plane of the disc. At each of the cut away portions of the plate four tongues may conveniently be produced, all facing towards the radius of symmetry of the cut away portion, two of said tongues being directly secured to the facing and two being arranged to coact with said facing only after a predetermined amount of compression of the plate has taken place. For convenience in manufacture all of the tongues at each of the cut away portions may be directed so that their axes intersect at a point common to all.

A modified form of plate according to the invention comprises a circular disc carrying a facing on each side and formed around its margin with a series of cut away portions each of which is branched so as to produce a group of tongues, some of the tongues in each group being deflected and attached to a facing on one side of the plate and others in said group being deflected to a less extent so as to cooperate with the facing after a predetermined amount of compression has taken place, the tongues which act at any one stage in the compression being equal in size and being distributed substantially uniformly with regard to the radial width of the facing whereby the latter at all times tends to maintain a position in which it lies parallel with the plane of the disc.

Stated somewhat differently, the invention contemplates a clutch driven plate comprising a pair of parallel friction facings and a mounting disc upon which such facings are mounted, the peripheral region of the disc being slotted so as to form a series of circumferentially separated cushion units, including radially extending relatively narrow spoke or neck portions joined to the central region of the disc and circumferentially extending projections joined to the radially outer regions of the spoke portions and bent out of the plane of the spoke portions for engagement at their free end extremities with the inner faces of the friction facings whereby when the facings are compressed under clutch packing pressure, such extensions will be deflected toward the plane of the disc, yieldingly resisting movement of the facings toward each other by a bending action between said extensions and said spoke portions and a torsional action in said spoke portions.

Examples of clutch plates according to the invention are shown in the accompanying drawings in which Figure 1 is a part sectional elevation of a portion of the plate showing one construction;

Figure 2 is a diagrammatic section on the line 2—2 of Figure 1;

Figure 3 is a diagrammatic section on the line 3—3 of Figure 1;

Figure 8 is a fragmentary elevation of a further construction of clutch disc; and Figure 9 is a radial section on the line 9—9 of Figure 8.

Figure 4:
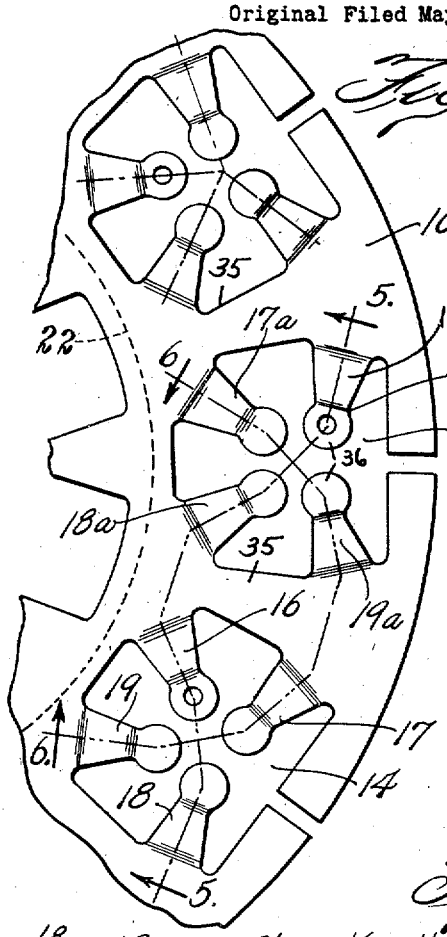
Figure 4 shows by a fragmentary elevation a modified construction of plate in which both facings are resiliently mounted.

Referring firstly to Figure 1 in which one half only of a complete disc and a portion of the facing are shown, it will be seen that the circular disc 10 is formed from resilient sheet metal and is flat for the major part of its area. It is provided on its front and rear surfaces with annular facings 11 and 12 respectively, the latter being secured rigidly to the disc 10 by a series of rivets 13. At intervals around its periphery the disc 10 is cut away as indicated at 14, the shape of the cut away spaces being substantially cruciform and being arranged so that a straight radial gap terminating at its outer part in a neck portion 15 is provided. In the example being described each cut away space 14 produces four inwardly facing tongues 16, 17, 18 and 19, these being of identical shape and size, primarily with a view to ensuring that the front facing 11 carried thereby shall at all times lie or tend to lie in a plane which is truly parallel with the plane of the disc 10. It will be noticed that the tongue 16 is formed with a hole 20 by which it is attached to the facing 11, and in order that these points of attachment may be uniformly distributed between the inner and outer margins of the facing 11 the tongues 16 and 17 are as shown interchanged for each succeeding cut away space 14.

In order to provide the requisite two stage resilient mounting for the facing 11 the tongues are deflected forwardly, the tongues 16 and 18 being bent so that their extremities are displaced from but lie parallel with the general plane of the disc 10. The tongues 16 are secured to the facing 11 by rivets 21 which serve to hold the facing 11 in place and also to transmit the driving torque when the clutch is in use. The tongues 17 and 19 on the other hand are bent to a similar shape but are less displaced from the disc 10 than are the tongues 16 and 18. Figure 3 shows the general relationship of the parts when the clutch plate is free from any compression forces, and it will be seen, therefore, that during the initial part of the engagement of the clutch inward movement of the facing 11 is resisted only by the pairs of tongues 16 and 18, thus forming the first stage. When the facing 11 comes into contact with the tongues 17 and 19, however, the resistance to compression is considerably increased, and in fact the clutch disc can be so designed that even when the clutch is fully engaged the tongues in the disc 10 are not absolutely flattened. This gives a certain resilience in the drive which is found to be advantageous. In the example shown in Figures 1 to 3 the tongues 16, 17, 18 and 19 are, of course, all deflected to one side of the disc 10.

Figure 5:
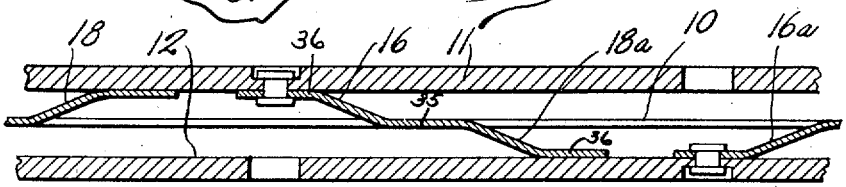
Figure 5 is a diagrammatic section on the line 5—5 of Figure 4.
Figure 6:
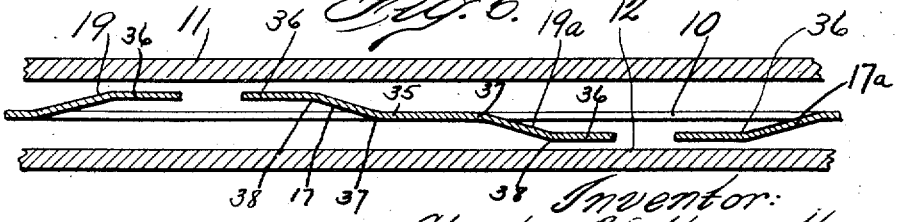
Figure 6 is a similar view taken on the line 6—6 of Figure 4.

A modified arrangement is, however, shown in Figures 4 to 6 in which the clutch disc 10 is substantially of the same form as before with cut away spaces 14. The groups of tongues are in this case bent alternately on opposite sides of the disc 10 so that both of the facings are supported in a resilient manner. This is shown clearly in Figures 5 and 6, the tongues 16 and 18 being bent upwardly to a relatively large extent while the corresponding tongues 18*a* and 16*a* of the next adjacent group are bent downwardly, all for the purpose of providing the first stage in the resilient compression of the clutch disc. The general arrangement of the tongues 19 and 17 is the same as before, and the similar tongues 19*a* and 17*a* are bent to the opposite side of the disc 10 for cooperating with the facing 12 only during the second stage of compression. The position of the inner margin of the facings 11 and 12 is indicated by the broken line 22, and it will be seen therefore that the tongues, in addition to being of equal strength on account of their identical size, are also uniformly distributed across the width of the facings, thereby ensuring that the latter shall tend always to remain in a plane lying parallel with the clutch disc 10 and will thus wear substantially uniformly over its whole area.

Figure 7:
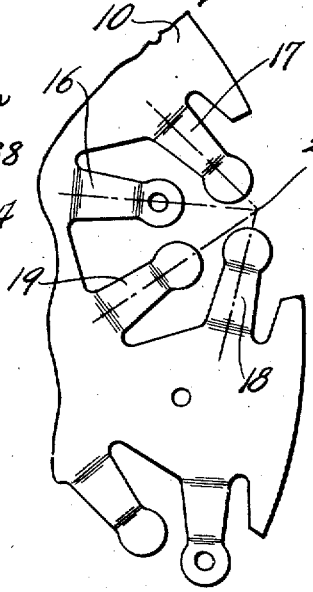
Figure 7 is a fragmentary view showing another configuration of clutch disc.

Figure 7 shows a somewhat modified shape of clutch disc 10, which nevertheless has the same general characteristics as those previously described. It will be noticed, however, that the axes of the tongues 16, 17, 18 and 19 intersect at a point 23, and the marking out of the disc is thereby facilitated. This also applies to the shape of disc shown in Figure 4.

Another modification of the invention is illustrated in Figures 8 and 9 in which the lower facing 12 is secured to the clutch disc 10 by means of pairs of rivets 24, and is thus non-resiliently mounted, while the upper facing 11 is attached by rivets 25 and 26 to tongues 27 and 28 which are deflected so that their ends lie out of the plane of the disc 10. The latter is also formed at intervals with similar tongues 29 and 30, which although cooperating with the facing 11 during the whole of the compression are not actually secured to said facing. The second stage in the compression takes place when the surface of the facing 11 contacts with tongues 31 and 32, which as seen in Figure 9 are also deflected with regard to the general plane of the disc 10 but not to such a great extent as the tongues 27—30. Each of the cut away spaces formed at intervals around the periphery of the disc 10 in shape resembles the letters T and H, the transverse limb of the H being arranged radially and in register with the center part of the vertical limb of the T, thus in effect producing six tongues in each group.

The improved construction of plate may, of course, be utilized with various types of plate clutches, and if desired said plate may itself incorporate a coil spring, rubber buffer or other cushion drive between the plate and the usual shaft or spindle upon which it is mounted. Moreover, the form of the tongues and their method of manufacture may be arranged so as to provide the desired resilience, said tongues or equivalent means for providing the cushioning of the facings being in some cases attached as by welding or riveting to the clutch plate. In all cases the resilient mounting may be applied to both of the facings or only one of them, as desired. Further, the number of tongues provided in each group or series or the number of series may be modified, and, if desired, more than two separate sets may be provided so that the corresponding number of stages in the cushioning is obtained, said tongues or equivalent being of equal size and distribution so that the facing always maintains its parallel relationship with the clutch plate. The fact that the tongues are all of equal strength and the points at which the facing coacts with these tongues are all disposed substantially symmetrical with respect to the inner and outer edges of the facing enables this parallel relationship to be maintained, and also promotes uniformity in the wear of the facing.

It may now be noted, with reference to the form of the invention shown in Figs. 4, 5 and 6, that the periphery of the disc 10 is divided into a series of cushioning sectors, each including a relatively narrowed radial spoke portion 35 joined at its radial inner extremity to the body of the disc 10 and merging at its outer extremity in a circumferentially extended head portion including the tongues 17 and 19*a* in one series of sectors and the tongues 16*a* and 18 in the intervening series of sectors. The spoke portions 35 isolate the head portion of each cushioning sector from the central region of the disc, thus increasing the flexibility of the sectors. This may be understood by analyzing the cushioning operation of a single cushioning sector of this form of the invention.

Referring to one of the cushioning sectors shown in cross-section in Fig. 6, it will be apparent that as the friction facings 11 commence to bear against the diagonally opposite lands 36 of the tongues 17 and 19*a*, there will be a tendency to rotate the entire head portion of the cushioning sector in a counter-clockwise direction as viewed in Fig. 6. At the same time there will be a tendency for the tongues 17 and 19*a* to bend with reference to the spoke portions 35 back into the plane of the latter. However, since the cross-sectional area along the bend lines 37 in the tongues 17, 19*a* aggregates at least twice the cross-sectional area through the inner extremity of the spoke portion 35, the initial yielding of the cushion will consist largely in a twisting of the spoke portion 35. This will cause the outer region of the spoke portion 35 to become biased out of the plane of the disc 10 and as the compression of the facing progresses, points will be reached where the side extremities of the spoke portions 35, defined by the bends 37, and the ends of the lands 36, will contact the opposite facings, causing the tongues 17 and 19*a* to straighten out toward alignment with the plane of the spoke portions 35, yielding at the bends 37 and 38. Thus the cushioning action of the sectors is separated into an initial stage of largely torsional axis in the spoke portion 35, giving relatively light yieldable cushioning and a subsequent stage of bending action giving a stiffer, more resistant cushioning effect.

The same combination of torsional and bending action will take place in the alternate cushioning sectors, including the tongues 17 and 19*a*.

I claim:

1. A multi-stage cushioned clutch plate comprising a pair of facings and a disc on the opposite sides of which said facings are mounted, said disc having in its peripheral region a plurality of groups of resilient tongues, each said group comprising two pairs of tongues, the tongues of one pair being circumferentially opposed to the tongues of the remaining pair and all of the tongues having substantially symmetrical profile, said tongues being biased laterally from the plane of the disc so as to coact with at least one of said facings, each group being formed by a single cut-away space opening into the periphery of the disc, two of the tongues of said group having maximum bias for an initial stage of cushioning, and the other two of said tongues of said group having lesser bias so as to come into operation only for a subsequent stage of cushioning.

2. A multi-stage cushioned clutch plate comprising a pair of facings and a disc on the opposite sides of which said facings are mounted, the peripheral region of said disc having a plurality of groups of resilient tongues biased laterally from the plane of the disc so as to coact with at least one of said facings, each group being formed by a single cut-away space opening into the periphery of the disc, and including a set of tongues having maximum bias for an initial stage of cushioning, and a second set of tongues having lesser bias so as to come into operation only for a subsequent stage of cushioning, each said group comprising two pairs of tongues, the tongues of one pair being circumferentially opposed to the tongues of the remaining pair and all of the tongues having substantially symmetrical profile, said tongues of each group forming two series of radially spaced tongues one on either side of said cut-away space, whereby the facing engaged by said tongues tends at all times to assume a position lying truly parallel with the plane of the disc.

3. A clutch plate as defined in claim 1 wherein the points of coengagement between the tongues and the corresponding facing are uniformly distributed between the inner and outer margins of the facing.

4. A clutch plate comprising a disc carrying a facing on each side and formed at intervals around its circumference with cut away spaces which are shaped so as to provide in each case a straight radial gap extending inwardly to the full extent of the cut away portion, said gap being circumferentially branched to form a plurality of pairs of tongues which are bent laterally and coact with at least one of the facings, said tongues being bent out of the plane of the disc so that they form a plurality of series which come into operation successively during the engagement of the clutch, and those of said tongues comprising each individual series being of substantially equal size and shape whereby the facing at all times tends to assume a position lying truly parallel with the plane of the disc.

5. A multi-stage cushioned clutch plate comprising a pair of facings and a disc on the opposite sides of which said facings are mounted, said disc being formed with a plurality of circumferentially spaced radial gaps each branched circumferentially to provide a group of circumferentially opposed and radially spaced tongues biased laterally from the plane of the disc so as to coact with at least one of said facings, each of said groups including a set of diagonally opposed tongues having maximum bias for an initial stage of cushioning, and a second set of diagonally opposed tongues having a lesser bias so as to come into operation only for a subsequent stage of cushioning.

6. A clutch plate as defined in claim 4, wherein at each of the cut away spaces of the plate four tongues are produced, all facing towards the radius of symmetry of the cut away portion, two of said tongues being directly secured to the facing and two being arranged to coact with said facing only after a predetermined amount of compression of the plate has taken place.

7. A clutch plate as defined in claim 4 wherein all of the tongues at each of the cut away spaces are directed so that their axes intersect at a point common to all.

8. A clutch plate as defined in claim 1 wherein the resilient tongues are all deflected to one side of the disc and coact with one of the facings, the other facing being secured directly to the undeflected part of the disc.

9. A clutch plate as defined in claim 1 wherein both of the facings are carried entirely by resilient tongues and these are deflected some to one side of the disc and some to the other.

10. A multi-stage cushioned clutch plate comprising a pair of facings and a disc of spring material on the opposite sides of which said facings are mounted, said disc being formed with a plurality of circumferentially spaced radial gaps each branched circumferentially to provide a group of tongues each including a plurality of radially spaced pairs of circumferentially opposed tongues biased laterally from the plane of the disc so as to coact with at least one of said facings, each of said groups including a set of tongues having maximum bias for an initial stage of cushioning, and a second set of tongues having a lesser bias so as to come into operation only for a subsequent stage of cushioning, the tongues which act at any one stage in the compression being equal in size and being distributed substantially uniformly with regard to the radial width of the facing whereby the latter at all times tends to maintain a position in which it lies parallel with the plane of the disc.

11. A clutch plate comprising a circular disc provided with a facing on each side and formed around its margin with a series of cut-away spaces cruciform in shape and each including a radial gap extending to the periphery of the disc, each of said cut-away spaces being branched so as to produce a group of tongues, some of the tongues in each group being deflected and engaged with a facing on one side of the plate, and others in said group being deflected to a less extent so as to cooperate with the facing after a predetermined amount of compression has taken place, the tongues each acting at any one stage of compression being equal in size and being distributed substantially uniformly with regard to the radial width of the facing, whereby the facing at all times tends to maintain a position in which it lies parallel with the plane of the disc.

12. A clutch plate comprising a disc carrying a facing on each side, at least one of said facings being resiliently mounted upon tongues, and being arranged so that after a predetermined amount of compression the number of tongues coacting with the said facing is increased, characterized by the fact that said facing is mounted so that it at all times, both before and during compression, tends to remain parallel with the general plane of the disc, said tongues being formed by cut away spaces in the marginal region of said disc, each of said cut away spaces being in the form of a T with its vertical limb disposed radially and a superimposed H the transverse limb of which overlies the center part of the said vertical limb of the T.

13. A multi-stage cushioned clutch plate comprising a pair of facings, a hub, a disc mounted on said hub, a plurality of circumferentially spaced groups of resilient tongues carried by the peripheral region of said disc, and biased laterally to coact with at least one of said facings, each group of tongues defining a radial gap extending the full radial depth of the group and branched circumferentially to provide a plurality of radially spaced symmetrical pairs of circumferentially opposed tongues some of which are biased for an initial stage of cushioning and others of which are biased for a secondary stage of cushioning.

14. A multi-stage cushioned clutch plate comprising a pair of facings, a hub, a disc mounted on said hub, a plurality of circumferentially spaced groups of resilient tongues carried by the peripheral region of said disc, and biased laterally to coact with at least one of said facings, each group of tongues defining a space in the form of a T with its vertical limb disposed radially and at least one pair of opposed arms branching circumferentially from said vertical limb, and each group including a set of tongues having maximum bias for an initial stage of cushioning and a second set of tongues having a lesser bias, so as to come into operation only for a subsequent stage of cushioning.

15. A friction clutch plate comprising a pair of axially spaced relatively rigid friction facings, and a mounting disc the peripheral region of which extends between and supports said facings for cushioned movement toward each other while remaining in parallel planes, said peripheral region comprising a plurality of circumferentially separated cushions each including a circumferentially enlarged head portion and a reduced radial spoke portion joining said head portion to the body of the disc, said head portions being separated by spaces opening into the periphery of said mounting disc, each head portion extending from the spoke circumferentially and out of the plane of the spoke for engagement with a facing, whereby, as the facings are compressed toward each other, said cushions may yield with a combined torsional action in said spoke portion and a bending between said head portion and said spoke portion.

16. A friction clutch driven plate comprising a pair of axially spaced relatively rigid friction facings, and a mounting disc the peripheral region of which extends between and supports said friction facings for cushioned movement toward each other, said peripheral region comprising a plurality of circumferentially separated cushions each including a radial spoke portion joined at its inner extremity to the body of the disc and a pair of extensions joined to the outer region of said spoke portion along bend lines, said cushions being separated by spaces opening into the periphery of said mounting disc, said extensions projecting circumferentially on either side of said spoke portion and being bent out of the plane of the spoke portion on opposite sides of said plane, the free extremities of said extensions being adapted to coact with said facings to yieldingly resist the compression of the facings toward each other while allowing said facings to remain in parallel planes.

17. A friction clutch as defined in claim 16, wherein the aggregate cross-sectional area along said bend lines is considerably greater than the cross-sectional area of said spoke portions, whereby said cushions will yield with an initial torsional twisting of said spoke portions and a final stage of flattening of said extensions toward the plane of said spoke portion.

18. A friction clutch driven plate comprising a mounting disc of resilient sheet metal and a pair of axially spaced friction facings of relatively rigid material embracing and supported upon the peripheral region of said mounting disc, said peripheral region comprising a plurality of circumferentially separated cushions each including a radial spoke portion joined at its inner extremity to the body of the disc and a pair of extensions joined to the outer region of said spoke portion and projecting circumferentially on either side of said spoke portion and normally distorted out of the plane of said spoke portion, one on one side and the other on the other side of said plane, said cushions being separated by spaces opening into the periphery of said mountnig disc, the free extremities of said extensions being adapted to cooperate with the respective facings so as to yieldably resist movement of said facings toward each other under clutch packing pressure, said extensions each being adapted to contact only its respective facing during an initial stage of clutching action, whereby said spoke portion may twist so as to allow said extensions to approach a plane parallel to the plane of said facings, said extensions being adapted to cushion a final stage of clutching action by bending toward the plane of said spoke portion.

CHARLES WILLIAM HIGGS.